(12) United States Patent
Peacock et al.

(10) Patent No.: US 8,661,468 B2
(45) Date of Patent: Feb. 25, 2014

(54) INTELLIGENT PROGRAM GUIDE TIME SLOT SELECTION

(75) Inventors: Gavin Peacock, Walnut Creek, CA (US); James Roseborough, Piedmont, CA (US); David Lowell, San Francisco, CA (US); Aravind Nallan, San Jose, CA (US); Ian Farmer, Berkeley, CA (US)

(73) Assignee: MobiTV, Inc., Emeryville, CA (US)

( * ) Notice: Subject to any disclaimer, the term of this patent is extended or adjusted under 35 U.S.C. 154(b) by 1632 days.

(21) Appl. No.: 11/542,616

(22) Filed: Oct. 2, 2006

(65) Prior Publication Data

US 2008/0083001 A1 Apr. 3, 2008

(51) Int. Cl.
*G06F 3/00* (2006.01)
*G06F 13/00* (2006.01)
*H04N 5/445* (2011.01)

(52) U.S. Cl.
USPC ............ 725/39; 725/44; 725/50; 725/54

(58) Field of Classification Search
None
See application file for complete search history.

(56) References Cited

U.S. PATENT DOCUMENTS

| | | | | |
|---|---|---|---|---|
| 5,592,551 | A | * | 1/1997 | Lett et al. ............... 380/211 |
| 6,367,078 | B1 | * | 4/2002 | Lasky ................. 725/52 |
| 6,498,895 | B2 | | 12/2002 | Young et al. |
| 7,519,982 | B1 | * | 4/2009 | Gordon et al. ............ 725/54 |
| 2001/0056577 | A1 | * | 12/2001 | Gordon et al. ............ 725/52 |
| 2003/0115606 | A1 | * | 6/2003 | Menez ................. 725/60 |
| 2004/0002987 | A1 | * | 1/2004 | Clancy et al. ............ 707/101 |
| 2006/0123448 | A1 | * | 6/2006 | Ma et al. ............... 725/51 |

* cited by examiner

*Primary Examiner* — Nasser Goodarzi
*Assistant Examiner* — Mary A Kay
(74) *Attorney, Agent, or Firm* — Kwan & Olynick LLP

(57) ABSTRACT

Mechanisms are provided for allowing improved selection of program guide information. Program guide information includes channel, time, and program listing information. In particular examples, each program listing is associated with a time slot having beginning time slot boundary and an end time slot boundary. Program listing information can be viewed even after a current time passes an end time slot boundary. In some examples, program listing information may be removed after a predetermined period of time or after a predetermined period of disuse.

20 Claims, 8 Drawing Sheets

Current
Time 181

| Date 101 | | Time Slot 111 | Time Slot 113 | Time Slot 115 |
|---|---|---|---|---|
| Channel 121 | icon 131 | Program 141 | | |
| Channel 123 | icon 133 | Program 143 | | Program 145 |
| Channel 125 | icon 135 | Program 147 | | |
| Channel 127 | icon 137 | Program 151 | Program 153 | |
| ------------------- | ------------ | ------------------------------ | | |
| ------------------- | ------------ | ------------------------------ | | |

Figure 1

|  |  |  |  | Current Time 281 |
|---|---|---|---|---|
| Date 201 |  | Time Slot 211 | Time Slot 213 | Time Slot 215 |
| Channel 221 | icon 231 | Program 241 ||| 
| Channel 223 | icon 233 | Program 243 || Program 245 |
| Channel 225 | icon 235 | Program 247 |||
| Channel 227 | icon 237 | Program 251 | Program 253 ||
| ----------------- | ---------- | ----------------------- |||
| ----------------- | ---------- | ----------------------- |||

Figure 2

INTELLIGENT PROGRAM GUIDE TIME SLOT SELECTION

BACKGROUND OF THE INVENTION

1. Field of the Invention

The present disclosure relates to program guides. In one example, the present invention relates to methods and apparatus for selecting program guide information.

2. Description of Related Art

Various devices have the capability of providing program guide information along with video or audio streams. A user can select a particular channel and receive broadcast media for a selected channel. Program guide information including channel, title, and time information can assist the user in selecting a channel or a program. In many instances, program guide information is downloaded to a device from a network such as a wireless network, cable network, telephony network, etc.

However, mechanisms for providing program guide information to devices are limited. In many instances, program guide information is provided in a rigid and inflexible manner. Consequently, the techniques of the present invention provide mechanisms for improving the ability to select and obtain program guide information.

SUMMARY OF THE INVENTION

Mechanisms are provided for allowing improved selection of program guide information. Program guide information includes channel, time, and program listing information. In particular examples, each program listing is associated with a time slot having beginning time slot boundary and an end time slot boundary. Program listing information can be viewed even after a current time passes an end time slot boundary. In some examples, program listing information may be removed after a predetermined period of time or after a predetermined period of disuse.

In one example, a technique is provided. Program guide information is received at a device. A first request for program guide information is received from a user. The first request is associated with a first time slot and a first channel. The first time slot is associated with a beginning time slot boundary and an end time slot boundary. The first program listing is provided for the first channel at the first time slot. Multiple program listings including the first program listing are provided to a display associated with the device. The first program listing for the first channel at the first time slot is provided even after a current time has passed the end time slot boundary.

In another example, an apparatus including an input interface and an output interface is provided. The input interface is operable to receive program guide information and a first request for program guide information. The first request is associated with a first time slot and a first channel. The first time slot is associated with a beginning time slot boundary and an end time slot boundary. The output interface is operable to provide a first program listing for the first channel at the first time slot. Multiple program listings including the first program listing are provided to a display associated with the device. The first program listing for the first channel at the first time slot is provided even after a current time has passed the end time slot boundary.

These and other features and advantages of the present invention will be presented in more detail in the following specification of the invention and the accompanying figures, which illustrate by way of example the principles of the invention.

BRIEF DESCRIPTIONS OF THE DRAWINGS

The invention may best be understood by reference to the following description taken in conjunction with the accompanying drawings, which illustrate specific embodiments of the present invention.

FIG. 1 is a diagrammatic representation showing a block of a program guide.

FIG. 2 is a diagrammatic representation showing another block of a program guide.

DESCRIPTION OF EXAMPLE EMBODIMENTS

Figure 3:
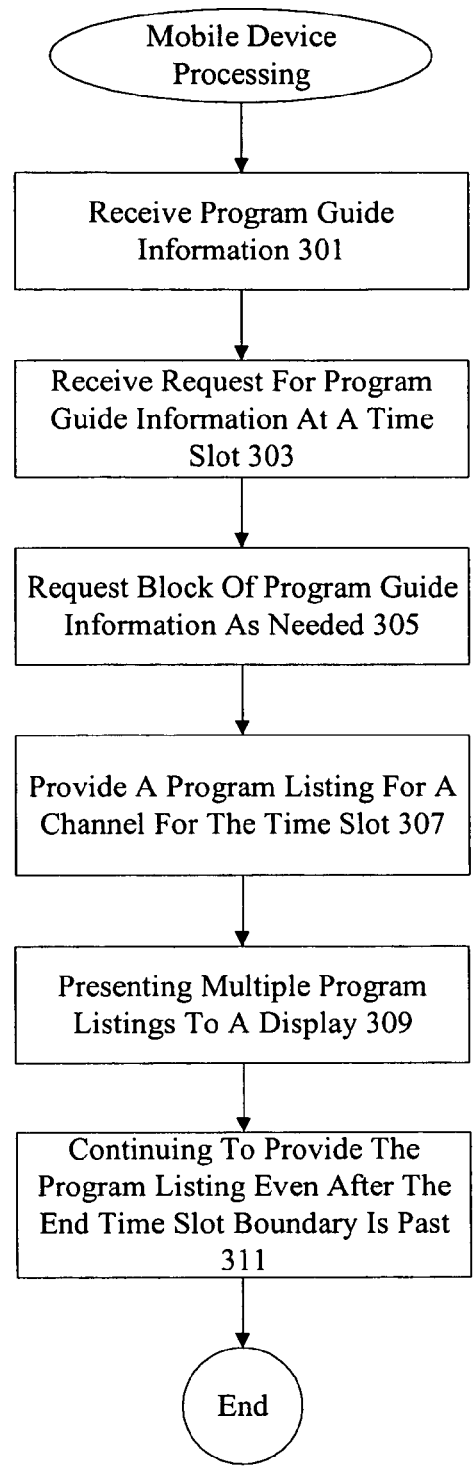
FIG. 3 is a flow process diagram showing mobile device processing.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular networks and particular devices. However, it should be noted that the techniques of the present invention can be applied to a variety of different networks and a variety of different devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

A variety of devices have the capability of providing audio and video streams such as live television or live radio. Many of these devices also are able to present program guides corresponding to the audio and video streams. Program guides include a variety of information that can be useful in selecting programs for viewing or listening. For examples, program guide information may include time slots, channels, icons, program listings included in time slots for particular channels, details on program listings, reviews, graphics, etc.

Time slots have beginning time slot boundaries and end time slots boundaries. Various time slots for the various channels include individual program listings. Program listings may provide a description about a particular program, rating information, review data, formatting, etc. For example, a time slot from 6 pm-6:30 pm having a beginning time slot boundary of 6 pm and an end time slot boundary of 6:30 pm for channel 121 may indicate that an evening news program is scheduled for the time slot. The description included in the 6 pm-6:30 pm time slot for channel 121 may include some information about the news program as well as rating information. Closed captioning availability may be shown. Icons and graphics as well as web links may also be available. In some instances, a program is displayed or projected while a user scrolls through program guide information.

A program may take occupy multiple time slots. According to various embodiments, time slots are a variety of lengths, such as 10 minutes, 15 minutes, 30 minutes, 1 hours, 2 hours, etc. Many available program guides have limited flexibility in selecting time slots or program listings. For example, program guides automatically scroll to the next timeslot immediately after a current time passes an end time slot boundary. In some particular examples, at 7 pm sharp, a program guide will stop displaying program information for the 6:30 pm-7 pm time slot, even if it was being viewed or accessed by a user. In many instances, the user can not scroll back or view program guide listing for previous time slots during the same day or time slots during previous days.

The techniques and mechanisms of the present invention recognize that it is often valuable to a user to continue viewing program guide information for time slots that have already elapsed. For example, some program listing may show the primary actors for a particular program, and it may be valuable to a user to be able to determine who some primary actors were for the program even after the end time slot boundary for the program has elapsed.

Consequently, the techniques and mechanisms of the present invention allow selective scrolling, instead of forcing automatic scrolling when a current time passes an end time slot boundary. Instead of scrolling automatically at half-hour intervals, for example, the guide view need not be scrolled at any particular time. In some particular examples, the guide view may be scrolled to the present time only when a program listing for an elapsed time slot unused for a predetermined period of time. Alternatively, a guide view may be scrolled only after a predetermined period of time, but a user can have the option to scroll back to view program listings for time slots that have since passed.

If a program guide is being viewed at a time slot boundary in the near future, the guide viewing experience will not be disrupted when a current time passes the end time slot boundary. In other words, if a program guide is being used to view information about half-hour long programs that air from 6:30 pm to 7 pm at 6:45 pm, the program guide time slot can continue to be browsed indefinitely.

FIG. 1 is an exchange diagram depicting one example of a program guide. In some examples, the time slots 111, 113, and 115 are each 30 minute time slots covering a time range from 1 pm to 2:30 pm. In one example, time slot 111 has a beginning time slot boundary of 1 pm and an end time slot boundary of 1:30 pm. Time slot 113 has a beginning time slot boundary of 1:30 pm and an end time slot boundary of 2:00 pm. Time slot 115 has a beginning time slot boundary of 2 pm and an end time slot boundary of 2:30 pm. Program 141 runs through time slots 111, 113, and 115. Program 143 runs through time slot 111 and time slot 113. Program 145 runs through time slot 115. It should be noted that various programs may also run through other time slots not shown. Program 147 runs through time slots 111, 113, and 115. Program 151 runs through time slot 111. Program 153 runs through time slots 113 and 115.

The program guide also identifies channels 121, 123, 125, and 127. In some examples, program guide structure information including a table of hundreds of channels is downloaded first and program listings are downloaded subsequently. Icons 131, 133, 135, and 137 are also provided for the various channels. In typical implementations, a current time 181 is used to determine what portion of a program guide can be viewed. For example, when a current time 181 resides at the beginning boundary for time slot 111, program information for time slot 111 is shown. For example, program 151 that plays during time slot 111 can be seen. When a current time 181 resides between the beginning boundary and the end boundary for time slot 111, program information for time slow 111 is still typically shown. However, when the current time 181 reaches the end boundary for time slot 111, time slot 111 is no longer shown.

In many instances, the change occurs automatically, even if a user was viewing information in a program listing included in time slot 111. For example, if a user was viewing information for program 151, the view would be interrupted when the current time 181 reaches the end boundary for time slot 111. In one particular example, if time slot 111 covers 5:30 pm-6 pm, the time slot 111 is shown before the current time 181 reaches 6 pm. At 6 pm, time slot 111 is abruptly removed, and time slot 113 is now shown as the earliest time slot with available program information.

It is recognized that it is often beneficial to be able to view program information even after a current time has passed an end time slot boundary associated with a particular time slot. For example, a user may not want a guide viewing experience to be interrupted. Alternatively, it may be useful to view information for programs that may have finished playing. A user may have a variety of reasons for being able to select and or view program information for past programs.

FIG. 2 is a diagrammatic representation showing another example of a program guide. In some examples, the time slots 211, 213, and 215 are each 30 minute time slots covering a time range from 1 pm to 2:30 pm. In one example, time slot 211 has a beginning time slot boundary of 1 pm and an end time slot boundary of 1:30 pm. Time slot 213 has a beginning time slot boundary of 1:30 pm and an end time slot boundary of 2:00 pm. Time slot 215 has a beginning time slot boundary of 2 pm and an end time slot boundary of 2:30 pm. Program 241 runs through time slots 211, 213, and 215. Program 243 runs through time slot 211 and time slot 213. Program 245 runs through time slot 215. It should be noted that various programs may also run through other time slots not shown. Program 247 runs through time slots 211, 213, and 215. Program 251 runs through time slot 211. Program 253 runs through time slots 213 and 215.

The program guide also identifies channels 221, 223, 225, and 227. In some examples, program guide structure information including a table of hundreds of channels is downloaded first and program listings are downloaded subsequently. Icons 231, 233, 235, and 237 are also provided for the various channels. In typical implementations, a current time 281 is used to determine what portion of a program guide can be viewed. According to various embodiments, a current time is after time slots 211 and 213. For example, the current time may be 2:05 pm. The current time 2:05 pm is passed the end time slot boundaries for time slot 211 and 213 of 1:30 pm and 2:00 pm respectively. Nonetheless, program information included in time slots 211 and 213 can still be viewed. In particular examples, the program information can be viewed until a predetermined period of time after a user scrolls away from the time slots 211 and 213. In other examples, the program information can be viewed indefinitely.

Consequently, if a current time 281 passes an end time slot boundary for time slot 213, the program information for time slot 213 can still be viewed.

FIG. 3 is a flow process diagram showing one example of a device processing requests for guide information. At 301, a device receives program guide information. The program guide information can be received in a variety of manners. In some instances, program guide information is received first as program guide structure information with program guide content received subsequently. At 303, a device receives a request for program guide information. The request may originate from a user of the device. The request is typically associated with one or more time slots, one or more channels, one or more program titles. For example, the request may be to view channels 300-305 for time slots 4:00 pm-5:30 pm. At 305, additional program guide information may be requested. At 307, a program listing is provided for the channel at time slot 307. It should be noted that the program listing may be a single program title or numerous program titles. In particular embodiments, a program listing is a program shown at a time slot on a particular channel.

Multiple program listings are provided to a display at 309. The program listings may be for any variety of media stream. At 311, the program listing information for a particular time slot remains on the display even after the current time passes the time slot end boundary. For example, program information remains for time slot 3 pm-3:30 pm even at 3:42 pm. In some examples, program information for past time slots remains in a device memory so that it can be accessed for a predetermined period of time the time slot end boundary passes. For example, it may be accessible for up to a day after the time slot end boundary passes. Alternatively, it may be accessible indefinitely, as the program guide information can be obtained again from a server if it is no longer held on device memory.

A program guide can be created by a guide generator from information provided by a variety of content providers. According to various embodiments, the program guide can include program guide structure information and program guide content information. The program guide structure information may include simply a basic listing of channels without having program guide content information for hundreds or thousands of channels. The program guide content information may be downloaded dynamically. Consequently, program guide content for past time slots or even time slots on previous days can be dynamically obtained without using excessive memory on a device.

Figure 4:
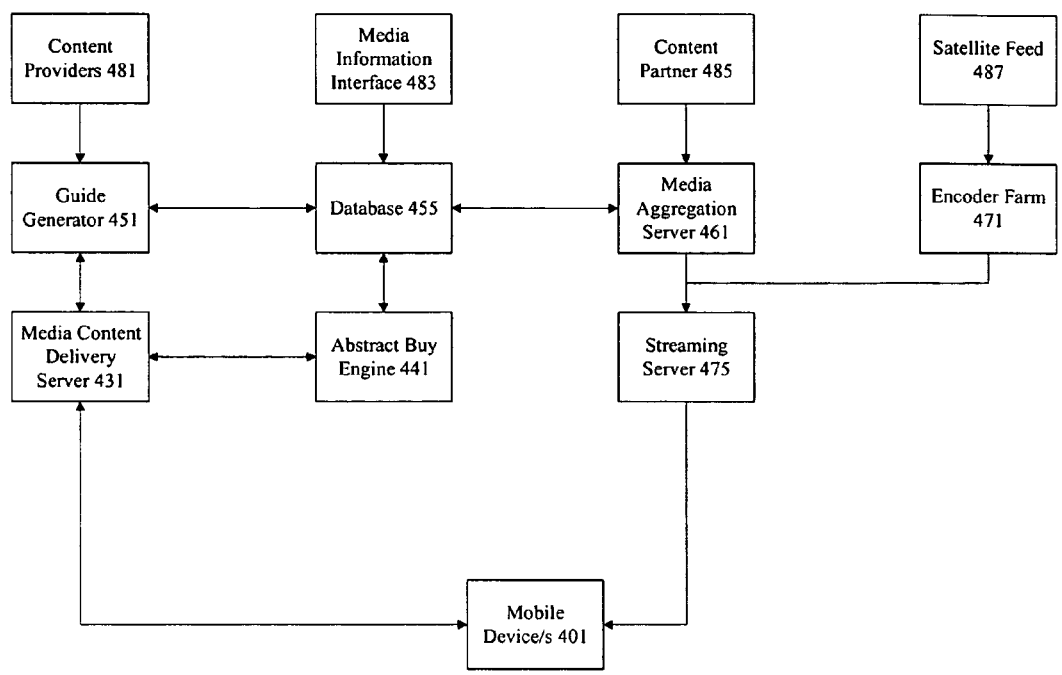
FIG. 4 is a diagrammatic representation showing a network that can use the techniques and mechanisms of the present invention.

FIG. 4 is a diagrammatic representation showing one example of a network that can use the techniques of the present invention. Although one particular example showing particular devices is provided, it should be noted that the techniques of the present invention can be applied to a variety of a computing devices and networks. According to various embodiments, the techniques of the present invention can be used on any device having a processor, memory, display, the capability of showing program guide information, the capability of obtaining program guide information over some type of network, such as wireless, cable, telephony, etc.

According to various embodiments, media content is provided from a number of different sources 485. Media content may be provided from film libraries, cable companies, movie and television studios, commercial and business users, etc. and maintained at a media aggregation server 461. Any mechanism for obtaining media content from a large number of sources in order to provide the media content to mobile devices in live broadcast streams is referred to herein as a media content aggregation server. The media content aggregation server 461 may be clusters of servers located in different data centers. According to various embodiments, content provided to a media aggregation server 461 is provided in a variety of different encoding formats with numerous video and audio codecs. Media content may also be provided via satellite feed 457.

An encoder farm 471 is associated with the satellite feed 487 and can also be associated with media aggregation server 461. The encoder farm 471 can be used to process media content from satellite feed 487 as well as possibly from media aggregation server 461 into potentially numerous encoding formats. The media content may also be encoded to support a variety of data rates. The media content from media aggregation server 461 and encoder farm 471 is provided as live media to a streaming server 475.

Possible client devices 401 include personal digital assistants (PDAs), cellular phones, personal computing devices, etc. According to various embodiments, the client devices are connected to a cellular network run by a cellular service provider. Cell towers typically provide service in different areas. Alternatively, the client device can be connected to a wireless local area network (WLAN) or some other wireless network. Live media streams provided over RTSP are carried and/or encapsulated on one of a variety of wireless networks.

The client devices are also connected over a wireless network to a media content delivery server 431. The media content delivery server 431 is configured to allow a client device 401 to perform functions associated with accessing live media streams. For example, the media content delivery server allows a user to create an account, perform session identifier assignment, subscribe to various channels, log on, access program guide information, obtain information about media content, etc. According to various embodiments, the media content delivery server does not deliver the actual media stream, but merely provides mechanisms for performing operations associated with accessing media.

In other implementations, it is possible that the media content delivery server also provides media clips, files, and streams. The media content delivery server is associated with a guide generator 451. The guide generator 451 obtains information from disparate sources including content providers 481 and media information sources 483. The guide generator 451 provides program guides to database 455 as well as to media content delivery server 431 to provide to mobile devices 401. The media content delivery server 431 is also associated with an abstract buy engine 441. The abstract buy engine 441 maintains subscription information associated with various client devices 401. For example, the abstract buy engine 441 tracks purchases of premium packages.

The media content delivery server 431 and the client devices 401 communicate using requests and responses. For example, the client device 401 can send a request to media content delivery server 431 for a subscription to premium content. According to various embodiments, the abstract buy engine 441 tracks the subscription request and the media content delivery server 431 provides a key to the client 401 to allow it to decode live streamed media content. According to various embodiments, all client devices 401 have access to media content broadcast over the airwaves. However, only client devices 401 authorized by a media content delivery server 431 can actually display certain media content. Similarly, the client device 401 can send a request to a media content delivery server 431 for a program guide for its particular program package. The media content delivery server 431 obtains the guide data from the guide generator 451 and associated database 455 and provides appropriate guide information to the client device 401.

Although the various devices such as the guide generator 451, database 455, media aggregation server 461, etc. are shown as separate entities, it should be appreciated that various devices may be incorporated onto a single server. Alternatively, each device may be embodied in multiple servers or clusters of servers. According to various embodiments, the guide generator 451, database 455, media aggregation server 461, encoder farm 471, media content delivery server 431, abstract buy engine 441, and streaming server 475 are included in an entity referred to herein as a media content delivery system.

Figure 5:
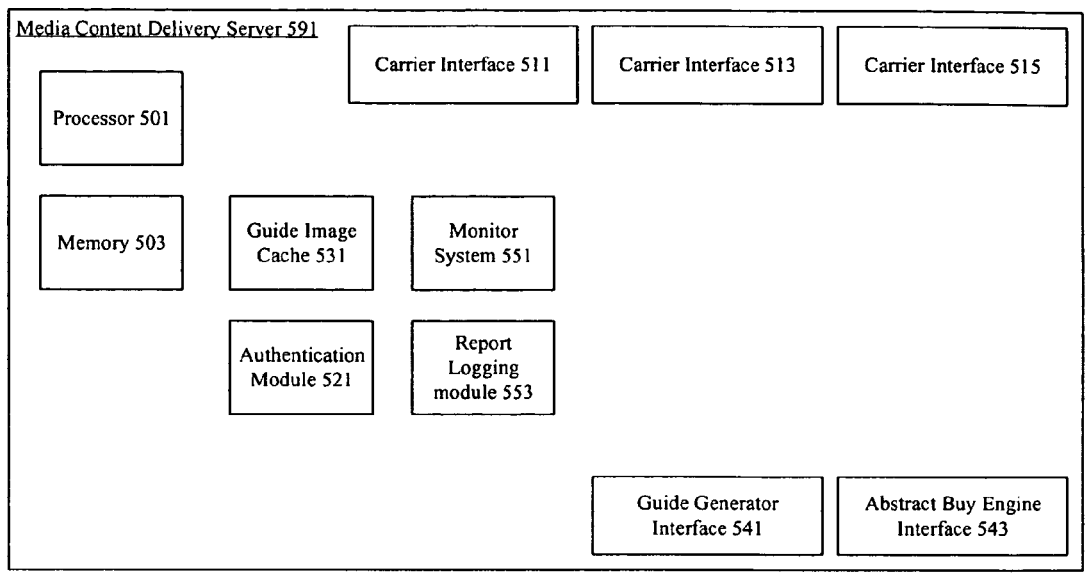
FIG. 5 is a diagrammatic representation depicting a content delivery system.

FIG. 5 is a diagrammatic representation showing one example of a media content delivery server 591. According to various embodiments, the media content delivery server 591 includes a processor 501, memory 503, and a number of interfaces. In some examples, the interfaces include a guide generator interface 541 allowing the media content delivery server 591 to obtain program guide information. The media content delivery server 591 also can include a program guide cache 531 configured to store program guide information and data associated with various channels. The media content delivery server 591 can also maintain static information such as icons and menu pages. The interfaces also include a carrier interface 511 allowing operation with mobile devices such as cellular phones operating in a particular cellular network. The carrier interface allows a carrier vending system to update subscriptions. Carrier interfaces 513 and 515 allow operation with mobile devices operating in other wireless networks. An abstract buy engine interface 543 provides communication with an abstract buy engine that maintains subscription information.

An authentication module 521 verifies the identity of mobile devices. A logging and report generation module 553 tracks mobile device requests and associated responses. A monitor system 551 allows an administrator to view usage patterns and system availability. According to various embodiments, the media content delivery server 591 handles requests and responses for media content related transactions while a separate streaming server provides the actual media streams. Media streams are broadcast to mobile devices, but mobile devices are not configured to access and a user is not able to view media content unless appropriate authorizations are made through a media content delivery server 591. In some instances, a media content delivery server 591 may also have access to a streaming server or operate as a proxy for a streaming server. But in other instances, a media content delivery server 591 does not need to have any interface to a streaming server. In typical instances, however, the media content delivery server 591 also provides some media streams. The media content delivery server 591 can also be configured to provide media clips and files to a user in a manner that supplements a streaming server.

Although a particular media content delivery server 591 is described, it should be recognized that a variety of alternative configurations are possible. For example, some modules such as a report and logging module 553 and a monitor 551 may not be needed on every server. Alternatively, the modules may be implemented on another device connected to the server. In another example, the server 591 may not include an interface to an abstract buy engine and may in fact include the abstract buy engine itself. A variety of configurations are possible.

Figure 6:
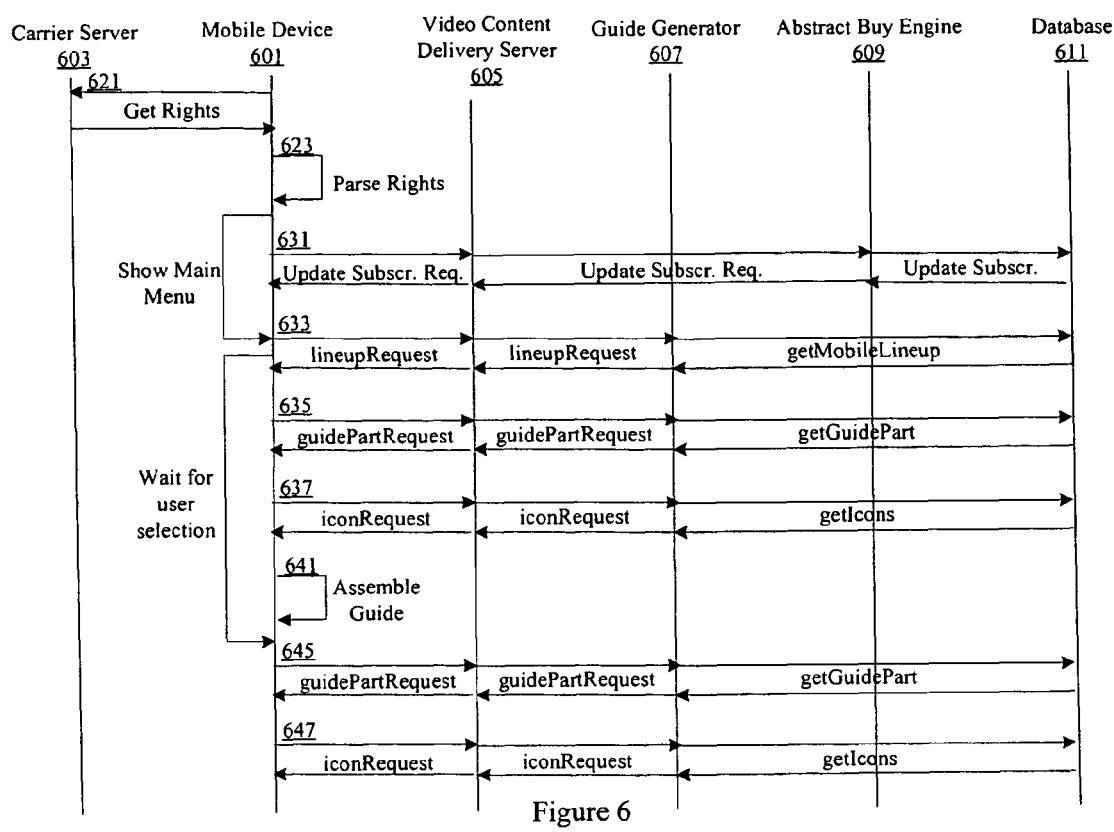
FIG. 6 is an exchange diagram showing a guide request sequence.

FIG. 6 is an exchange diagram showing one example of a mobile guide delivery sequence. A mobile device 601 obtains subscription service rights information from a carrier server 603. According to various embodiments, the mobile device 603 parses and displays information associated with the rights at 623. In one example, a root menu showing subscribed and available channels is shown.

According to various embodiments, the mobile device 601 sends an update subscriptions request message at 631 to a media content delivery server 605. The media content delivery server 605 forwards the update subscriptions request message to an abstract buy engine 609. The abstract buy engine 609 sends an update subscriptions message to the database 611. The mobile device 601 also sends a lineup request message 635 to the media content delivery server 605. The lineup request message is forwarded to a guide generator 607. The guide generator obtains a lineup for the mobile device from the database 611. The abstract buy engine 609 is not involved in this particular request transaction. At 635, the mobile device sends a guide part request to the media content delivery server 605. In some examples, the request is a request for the entire program guide. In typical examples, the request is a request for a portion of the guide or a program guide information block. The program guide information block request is forwarded to a guide generator 607. The guide generator obtains the guide part from a database 611 or generates it based on other information.

In some examples, icons are also requested by the mobile device 601 at 637. The mobile device 601 sends an icon request to the media content delivery server 605. The media content delivery server 605 forwards the icon request to the guide generator 607. The guide generator obtains icons from the database 611. According to various embodiments, other information such as advertisements and media clips are also requested or provided along with the icons. At 641, the guide is assembled at the mobile device 601. The user can then scroll through the guide or jump to a particular location in the guide. Some portions of the guide may not yet be downloaded. Consequently, additional guide part requests and icon requests may be sent by a mobile device 601 at 645 and 647. The additional program guide information block requests and icon requests at 645 and 647 may be sent for different channels, different channel blocks, or different time periods.

Figure 7:
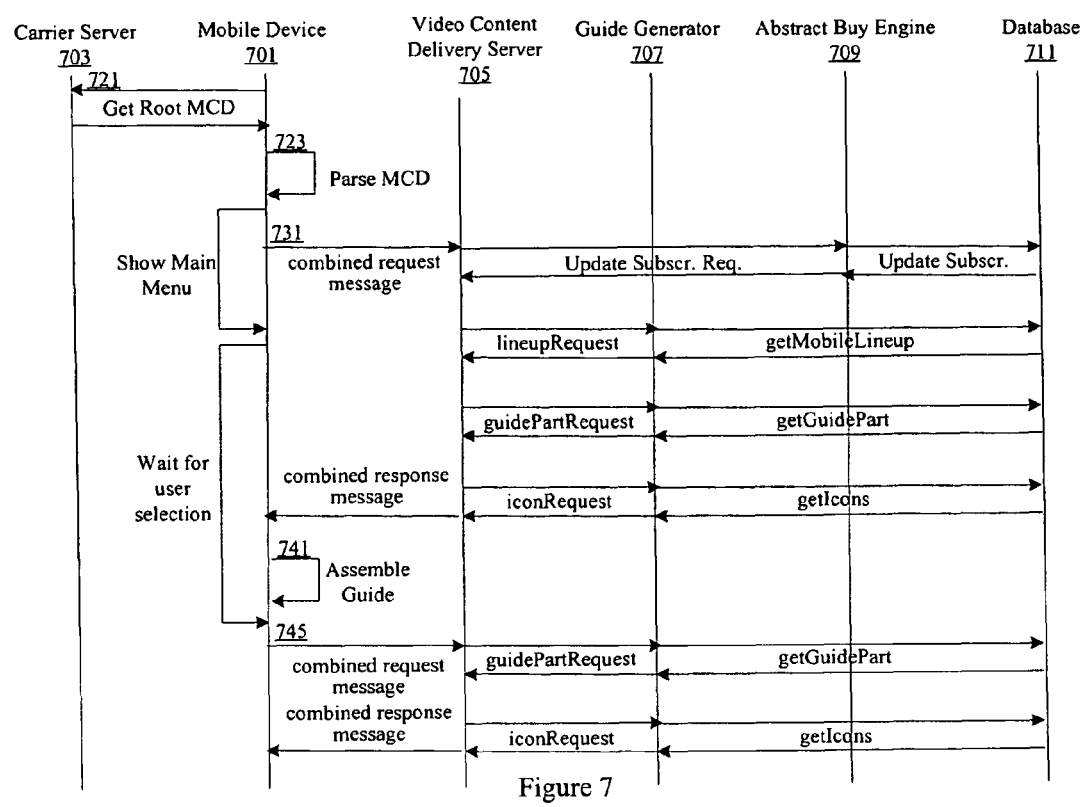
FIG. 7 is an exchange diagram showing another guide request sequence.

FIG. 7 is an exchange diagram showing one example of a mobile guide delivery sequence where multiple requests are included in a request message. A mobile device 701 obtains descriptor information from a carrier server 703. In one example, descriptor information is subscription service information. The subscription service information provides subscription and menu information to the mobile device 701. According to various embodiments, the mobile device parses and displays information associated with the rights at 723. In one example, a root menu showing subscribed and available channels is shown.

According to various embodiments, the mobile device 701 sends an update subscriptions request message at 731 to a media content delivery server 705. The update subscriptions request message also includes a lineup request, a guide part request, and an icon request.

To improve efficiency, it is possible to reduce the total number of round trips between a mobile device 701 and a media content delivery server 705. Therefore, it is beneficial to batch together many of these mobile device 701 requests into a single message 731 sent to the media content delivery server 705. The server responses can similarly be sent as a single message back to the mobile device 701. In one example, the following XML code could used to batch requests into a single request message:

```
<mobiTalkRequest version="1.0" haltOnFailure="true">
  <request>
    <updateSubscriptionsRequest userId="xyz">
    </updateSubscriptionsRequest>
  </request>
  <request>
    <iconRequest userId="xyz" iconIdList="74,23" />
  </request>
  <request>
    <lineupDetailRequest idList="74,23,101" ... />
  </request>
</mobiTalkRequest>
```

According to various embodiments, it is also possible to increase the number of requests that can be included in a single message by allowing results from early requests in the batch to make their way as inputs into the later requests in the message. For example, the following batch includes a newAccountRequest which creates a new "userId" and a lineupRequest which takes "userId" as an argument:

```
<mobiTalkRequest version="1.0" haltOnFailure="true">
  <request>
    <newAccountRequest vendorUserId="abc" vid="FOO-BAR" ... />
  </request>
  <request>
    <lineupRequest userId="{USERID}" guideType="mobile" ... />
  </request>
</mobiTalkRequest>
```

The name of intermediate results such as "USERID" in the above example can be well-known from the protocol documentation, or can be explicitly named in the protocol, such as:

```
<mobiTalkRequest version="1.0" haltOnFailure="true">
  <request>
    <newAccountRequest                  vid="FOO-BAR"
userIdResultName="USERID"
      customerNumResultName="CUSTNUM" ... />
  </request>
  <request>
    <lineupRequest userId="{USERID}" guideType="mobile" ... />
  </request>
</mobiTalkRequest>
```

According to various embodiments, these intermediate results can be implemented on the server by an associative array with names and values that get filled in during the processing of the batch. In some example, before processing any request in the batch, the server replaces all intermediate result names in that request (such as "{USERID}" above) with the corresponding value computed earlier in the batch and stored in the associative array.

The media content delivery server 705 extracts the requests from the request message received from the mobile device 701. The media content delivery server 705 forwards the update subscriptions request message to an abstract buy engine 709. The abstract buy engine 709 sends an update subscriptions message to the database 711. The lineup request message is forwarded to a guide generator 707. The guide generator obtains a lineup for the mobile device from the database 711. At 735, the mobile device sends a guide part request to the media content delivery server 705. In some examples, the request is a request for the entire program guide. In typical examples, the request is a request for a portion of the guide. The guide part request is forwarded to a guide generator 707. The guide generator obtains the guide part from a database 711. The mobile device 701 sends an icon request to the media content delivery server 705. The media content delivery server 705 forwards the icon request to the guide generator 707. The guide generator obtains icons from the database 711. According to various embodiments, other information such as advertisements and media clips are also requested or provided along with the icons. A single response is sent from the media content delivery server 705 to the mobile device 701.

At 741, the guide is assembled at the mobile device 701. The user can then scroll through the guide or jump to a particular location in the guide. Some portions of the guide may not yet be downloaded. Consequently, additional guide part requests and icon requests may be sent by a mobile device 701 at 745 in batched format. The additional requests at 745 may be sent for a different block of channels or a different time period.

Figure 8:
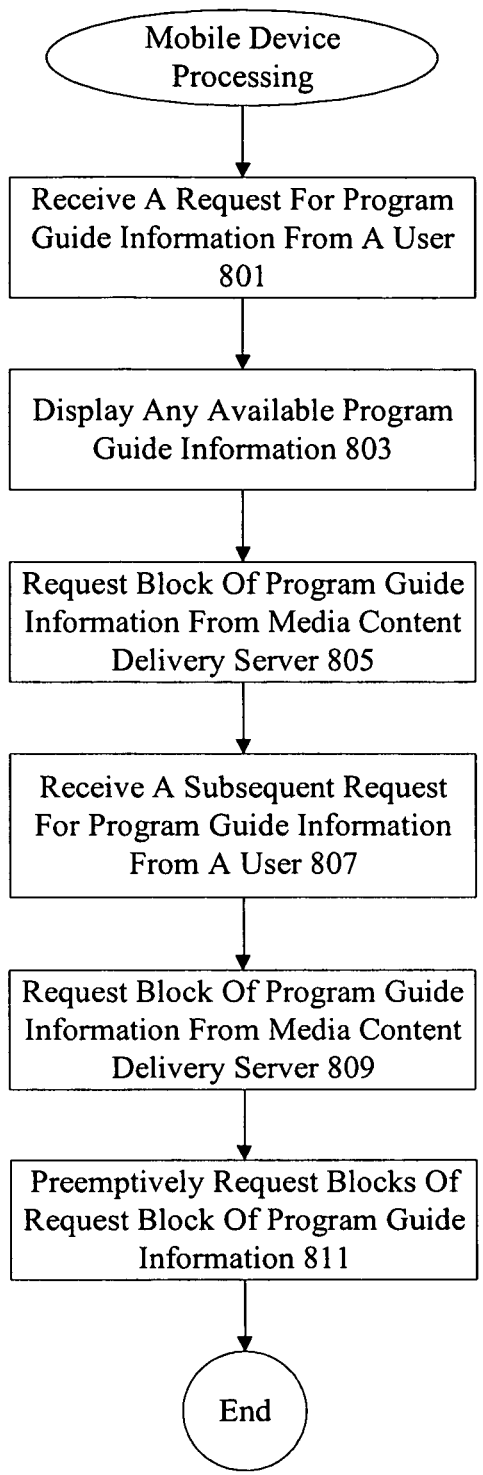
FIG. 8 is a flow process diagram showing mobile device processing.

FIG. 8 is a flow process diagram showing one example of a request for program guide information. At 801, a request for program guide information is received from a user. The request may result from a user selection to view a certain portion of a program guide. According to various embodiments, some program guide information may already be available on the device. For example, a listing of channels may be available. At 803, any program guide information available is displayed. At 805, a mobile device requests a block of program guide information from a media content delivery server. The block of program guide information may have a size determined by the screen of a mobile device. Alternatively, the block of program guide information may have a size determined by the amount of memory available on the mobile device. Other considerations such as bandwidth availability can also be taken into account. At 807, a mobile device receives a subsequent request from a user for program guide information.

According to various embodiments, the subsequent request results from a user scrolling, jumping, or otherwise navigating to a particular portion of a program guide. If the mobile device does not already have the information, the block of program guide information is requested from a media content delivery server at 809. It should be noted that program guide information can also be requested from other entities related to media content delivery servers. At 811, blocks of program guide information can be preemptively requested. Alternatively, blocks of program guide information can be preemptively provided to a mobile device. A variety of mobile devices can be used. According to various embodiments, a mobile device includes a display, a processor, memory, an interface operable to communicate with a media content delivery server, and an input interface operable to allow a user to operate the device. Possible mobile devices include cellular phones, personal digital assistants, portable computing devices, etc.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
   receiving program guide information from a server for a first block of channels at a device, the program guide information from the server for the first block of channels excluding program guide information for a second block of channels;
   receiving a first request for program guide information, the first request associated with a first time slot and a first channel, the first time slot associated with a beginning time slot boundary and an end time slot boundary;
   providing a first program listing for the first channel at the first time slot, wherein a plurality of program listings including the first program listing are provided to a display associated with the device;
   sending a request to the server for program guide information for the second block of channels, the second block of channels excluding the first block of channels, the program guide information for the second block of channels corresponding to the first time slot and a second channel;
   receiving program guide information from the server for the second block of channels at the device, the program guide information from the server for the second block of channels excluding program guide information for the first block of channels;
   continuing to provide the first program listing for the first channel at the first time slot even after a current time has passed the end time slot boundary and after receiving program guide information from the server for the second block of channels, wherein the first time slot falls at a predetermined time period A and the first program listing is provided even when the current time falls after the predetermined time period A.

2. The method of claim 1, wherein the first program listing for the first channel at the first time slot is provided indefinitely.

3. The method of claim 1, wherein the first program listing for the first channel at the first time slot is provided until the first program listing is not viewed for a predetermined period of time.

4. The method of claim 1, wherein the device is a mobile device.

5. The method of claim 1, wherein receiving program guide information at the device comprises receiving program guide content information after the program guide structure information is received.

6. The method of claim 1, wherein the first program listing is further associated with a first day.

7. The method of claim 6, wherein the first program listing is provided to the display associated with the device even after a current day has passed the first day.

8. The method of claim 6, receiving a second request for program guide information, the second request associated with a second time slot and a second channel.

9. The method of claim 6, providing a second program listing for the second channel at the second time slot.

10. The method of claim 1, wherein the first time slot is 7 pm-9 pm.

11. The method of claim 10, wherein the first program listing is provided even when the current time is 10 pm.

12. An apparatus, comprising:
    an input interface operable to receive program guide information for a first block of channels, the program guide information for the first block of channels excluding program guide information for a second block of channels, the program guide information associated with a first time slot and a first channel, the first time slot associated with a beginning time slot boundary and an end time slot boundary;
    an output interface operable to send a request for second program guide information for a second block of channels, the second block of channels excluding the first block of channels, the program guide information for the second block of channels associated with the first time slot and a second channel;
    a display interface operable to provide a first program listing for the first channel at the first time slot, wherein a plurality of program listings including the first program listing are provided to a display associated with the device;
    wherein the first program listing for the first channel at the first time slot is provided even after a current time has passed the end time slot boundary and program guide information for the second block of channels has been received, the program guide information from the server for the second block of channels excluding program guide information for the first block of channels, wherein the first time slot falls at a predetermined time period A and the first program listing is provided even when the current time falls after the predetermined time period A.

13. The apparatus of claim 12, wherein the first program listing for the first channel at the first time slot is provided indefinitely.

14. The apparatus of claim 12, wherein the first program listing for the first channel at the first time slot is provided until the first program listing is not viewed for a predetermined period of time.

15. The apparatus of claim 12, wherein the device is a mobile device.

16. The apparatus of claim 12, wherein receiving program guide information at the device comprises receiving program guide content information after the program guide structure information is received.

17. The apparatus of claim 12, wherein the first program listing is further associated with a first day.

18. The apparatus of claim 17, wherein the first program listing is provided to the display associated with the device even after a current day has passed the first day.

19. The apparatus of claim 17, receiving a second request for program guide information, the second request associated with a second time slot and a second channel.

20. A non-transitory computer readable medium comprising:
    computer code for receiving program guide information from a server for a first block of channels at a device, the program guide information from the server for the first block of channels excluding program guide information for a second block of channels;
    computer code for receiving a first request for program guide information, the first request associated with a first time slot and a first channel, the first time slot associated with a beginning time slot boundary and an end time slot boundary;
    computer code for providing a first program listing for the first channel at the first time slot, wherein a plurality of program listings including the first program listing are provided to a display associated with the device;
    computer code for sending a request to the server for program guide information for the second block of channels, the second block of channels excluding the first block of channels, the program guide information for the second block of channels corresponding to the first time slot and a second channel;

computer code for receiving program guide information from the server for the second block of channels at the device, the program guide information from the server for the second block of channels excluding program guide information for the first block of channels;

computer code for continuing to provide the first program listing for the first channel at the first time slot even after a current time has passed the end time slot boundary and after receiving program guide information from the server for the second block of channels, wherein the first time slot falls at a predetermined time period A and the first program listing is provided even when the current time falls after the predetermined time period A.

* * * * *